United States Patent Office 3,086,045
Patented Apr. 16, 1963

3,086,045
CARBOXYLIC ACID ESTERS OF POLYFUNC-
TIONAL HYDROXYMETHYL ETHERS AND
A PROCESS FOR THEIR PRODUCTION
Ernst Ploetz, Ludwigshafen (Rhine), Germany, assignor
to Badische Anilin- & Soda-Fabrik Aktiengesellschaft,
Ludwigshafen (Rhine), Germany
No Drawing. Filed July 26, 1960, Ser. No. 45,263
Claims priority, application Germany July 29, 1959
10 Claims. (Cl. 260—488)

The present invention relates to carboxylic acid esters of polyfunctional hydroxymethyl ethers and to a new process for their production.

A certain class of such esters is described in the literature, but their preparation has hitherto been difficult and expensive. Thus the carboxylic acid esters of the bis-hydroxymethyl ethers of glycols and polyglycols have already been prepared by reacting the bis-halogenmethyl ethers of glycols and polyglycols with carboxylic acid salts in the presence of inorganic basic substances. The esters obtained according to this known method have become known as treatment agents for textiles containing celloulose.

It is an object of the present invention to provide a new improved process for the production of carboxylic acid esters of polyfunctional hydroxymethyl ethers.

It is another object to make available new agents capable of being used as active substances in improved treatment agents for textiles containing or consisting of cellulose.

These and other objects are achieved by reacting 1 mol of an organic compound which contains 2 to 6 primary or second alcoholic hydroxyl groups at an elevated temperature with at least 2 mols of formaldehyde, or polymerized formaldehyde and treating the resultant hemiacetal in the absence of water with at least 2 mols of an acetylating or propionylating agent.

The organic compounds used as initial materials which contain 2 to 6 primary or secondary alcoholic hydroxyl groups may also be called polyhydroxy compounds. They may, in addition to the oxygen in the hydroxyl groups, contain sulfur, oxygen and preferably nitrogen as additional hetero-atoms. Although the above-mentioned reaction may be carried out with any compounds containing more than two primary or secondary hydroxyl groups, initial materials with up to 6 hydroxyl groups and a molecular weight of up to 500 are preferred for industrial use. As examples of compounds with 2 to 6 hydroxyl groups there may be mentioned polyhydroxy derivatives of aliphatic hydro-carbons, i.e., those of alkanes, alkenes and alkines which may also have in the molecule for example aldehyde, ether, thioether, sulfone and/or amino groups. Such compounds include ethylene glycol, propylene glycols, butane-diols, butene-diol, butine-diol, hexane-diol-(1,6), hexane-diol-(2,4), glycerol, trimethylolpropane, erythritols, for example pentaerythritol, pentitols, hexitols, pentoses and hexoses, polyhydroxyalkyl ethers, such as di-, tri- and hexaethylene glycol ethers and the corresponding polypropylene glycol ethers, polyhydroxy-dialkyl thioethers, such as thiodiglycol, polyhydroxydialkylsulfones, such as dihydroxydiethylsulfone, and polyhydroxyalkylamines, and also their quaternary ammonium salts, such as triethanolamine, dihydroxypropylethylamine, dihydroxyethylpiperazine, tetrahydroxyethylammonium chloride, trihydroxyethylmethylammonium methosulfate and octadecyl-trihydroxyethylammonium sulfate. The last-mentioned class of amines and quaternary ammonium salts is of special industrial importance for the purposes of this invention. This class of substances may be represented by the following general formulae:

I
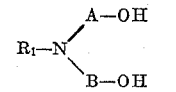

II
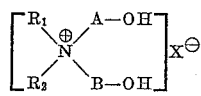

in which A and B represent identical or different alkylene radicals, preferably ethylene, propylene and butylene radicals, $R_1$ represents an alkyl radical with 1 to 20 carbon atoms, a hydroxyethyl, hydroxypropyl or hydroxybutyl radical, $R_2$ an alkyl radical with 1 to 4 carbon atoms, possibly substituted by a hydroxyl group and $X^\ominus$ an equivalent of an anion, preferably the chloride, sulfate or methosulfate anion. The reaction of the substances represented by the Formulae I and II with formaldehyde and acetylating or propionylating agents leads to textile treatment agents of special effectiveness. They are compounds of the formula

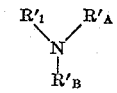

in which $R'_A$ and $R'_B$ represent acyloxymethyleneoxyalkyl groups in which the acyl radical has 2 or 3 carbon atoms and the alkyl radical 2 to 4 carbon atoms, and $R'_1$ represents an acyloxymethyleneoxyalkyl group in which the acyl radical has 2 or 3 carbon atoms and the alkyl radical 2 to 4 carbon atoms, or an alkyl group with 1 to 20 carbon atoms, or compounds of the formula:

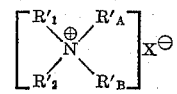

in which $R'_A$ and $R'_B$ represent acyloxymethyleneoxyalkyl groups in which the acyl radical has 2 or 3 carbon atoms and the alkyl radical 2 to 4 carbon atoms, $R'_1$ represents an acyloxymethyleneoxyalkyl group in which the acyl radical has 2 or 3 carbon atoms and the alkyl radical 2 to 4 carbon atoms, or an alkyl group with 1 to 20 carbon atoms, $R'_2$ an alkyl group with 2 to 4 carbon atoms, a hydroxyalkyl group with 2 to 4 carbon atoms or an acyloxymethyleneoxyalkyl group in which the acyl radical has 2 or 3 carbon atoms and the alkyl radical 2 to 4 carbon atoms, and $X^\ominus$ represents an equivalent of an anion.

The polyfunctional hydroxy compounds are reacted with formaldehyde. Preferably an amount of this substance equivalent to the hydroxyl groups is used, i.e., a maximum of 6 mols of formaldehyde per mol of hydroxy compound, but it is also possible, for reaction with trihydric and higher polyhydric hydroxy compounds to use smaller amounts, down to a minimum of two mols of formaldehyde. The formaldehyde may be added to the hydroxy compound in free form, either anhydrous or as an aqueous solution, or in the form of its readily cleavable polymers, such as trioxymethylene and paraformaldehyde. The reaction to form the hemiacetals proceeds at an elevated temperature, preferably at 80° to 130° C. At temperatures lower than 80° C. the reaction proceeds only slowly, whereas at temperatures higher than 130° C. there is the risk of the hemiacetals being split. The formation of the hemiacetals may be carried out in the presence or absence of water. If however the hemiacetals have been prepared from aqueous formaldehyde solutions, it is necessary to remove the water from the reaction mixture, prior to the subsequent acylation, by distillation, if necessary under reduced pressure. It is also possible to work in the presence of inert solvents, such as tetrahydrofurane or dimethylformamide. For the acetylation or propionylation of the hemiacetals there are used the usual acylating agents, as for example the acid anhydrides, acid halides, such as acid chlorides and bromides, and ketenes derived from acetic acid and propionic acid. It is preferable to use acetic anhydride and propionic anhydride as acylating agents, because the low molecular weight carboxylic acids forming during acylation may, in the preparation of textile treatment agents, as a rule remain in the reaction mixture. The acylating agent is added, advantageously gradually and in small portions, to the hemiacetal, the amounts being chosen so that at least two hydroxyl groups are reacted. 2 to 6 mols of acylating agent are therefore required per mol of polyhydroxy compound. For example there may be used the amount of acylating agent corresponding to the formaldehyde reacted. Hemiacetals which contain more than two hydroxymethyl ether groups, and possibly still further hydroxyl groups not reacted with an aldehyde, may be partly or completely acylated as desired. In this way the solubility of compounds which do not contain special hydrophilic groups can be influenced, because complete esterification of all hydroxyl groups leads to compounds of lower water solubility than esterification which is only partial.

The new esters of polyfunctional hydroxyalkyl ethers are valuable textile auxiliaries, especially for the finishing of cellulose fibers.

The following examples will further illustrate this invention, but the invention is not restricted to these examples. The parts specified in the examples are parts by weight.

*Example 1*

136 parts of pentaerythritol are mixed with 120 parts of paraformaldehyde and heated to 110° to 120° C. while stirring. Liquefaction takes place after a short time. The whole is allowed to cool to about 40° to 50° C. and then 408 parts of acetic anhydride are added in such a way that the temperature does not exceed 70° C. Small amounts of unreacted paraformaldehyde are removed by filtration and there are thus obtained 680 parts of a water-clear liquid which, besides glacial acetic acid, contains the tetra-acetyl ester of the tetrahydroxymethyl ether of pentaerythritol. The product has an acid number of 650 and an ester number of 290. It is soluble in water in concentrated form, but upon strong dilution it separates out.

*Example 2*

136 parts of pentaerythritol are converted with 60 parts of paraformaldehyde, in the way described in Example 1, into the hemiacetal and acetylated with acetic anhydride. The resultant mixture of polyacetyloxymethyl ethers of pentaerythritol is soluble in water.

*Example 3*

150 parts of triethylene glycol and 60 parts of paraformaldehyde are heated at 125° C. until completely liquefied, which takes about 30 minutes. The di-hemiacetal is reacted with 204 parts of acetic anhydride. A clear colorless solution of the water-soluble bis-acetoxymethyl ether of triethylene glycol is obtained.

*Example 4*

In the way described in the previous examples, 149 parts of triethanolamine are reacted with 90 parts of paraformaldehyde and then with 306 parts of acetic anhydride. The acetate of the triacetyl-trihydroxymethyl ether of triethanolamine is obtained; it is readily soluble in water.

*Example 5*

230 parts of tetraethanolammonium chloride are converted into the tetra-hemiacetal by heating with 120 parts of paraformaldehyde at 120° to 130° C. and then reacted with 408 parts of acetic anhydride. The tetraacetyloxymethyl ether of tetrahydroxyethylammonium chloride is obtained. The product is miscible with water in all proportions.

*Example 6*

245 parts of dimethyldihydroxyethylammoniummethosulfate are heated with 60 parts of paraformaldehyde at 120° to 130° C. until the paraformaldehyde has dissolved. The resultant hemiacetal is acylated at 50° to 70° C. with 260 parts of propionic anhydride. A clear colorless mixture of the bis-propionic acid ester of dimethyldihydroxyethylammonium methosulfate-bis-hemiacetal with propionic acid is obtained; it can be diluted with water to give a clear solution

*Example 7*

136 parts of pentaerythritol are mixed with 300 parts of a 40% aqueous formaldehyde solution. Then the water is distilled off and the residue heated for about 30 minutes at 120° C. There remain 250 parts of a milky liquid which consists of the hemiacetals of pentaerythritol. By reaction with 408 parts of acetic anhydride as described in Example 1, there is obtained a clear liquid whose properties agree with those of the product obtained according to Example 1.

*Example 8*

282 parts of hexaethylene glycol and 60 parts of paraformaldehyde are heated at 110° C. for 40 minutes. After cooling to 50° C. 204 parts of acetic anhydride are dripped in. The resultant solution of hexaglycol diacetoxymethyl ether is miscible with water in all proportions.

*Example 9*

60 parts of paraformaldehyde are introduced into a melt of 154 parts of sulfodiglycol at 110° C. After a clear liquid has formed, 204 parts of acetic anhydride are dripped in at 50° C. Thus a clear and colorless solution of the diacetoxymethyl ether of sulfodiglycol in glacial acetic acid is obtained which can be diluted with water in all proportions.

*Example 10*

60 parts of ethylene glycol and 60 parts of paraformaldehyde are reacted with each other at 110° C. to form a clear liquid. Ketene is introduced into this liquid for 3 hours at 60° C. The reaction product is taken up in 200 parts of methylene chloride. The whole is filtered, shaken out with ice water several times, dried with sodium sulfate, and the methylene chloride is removed in vacuo. The resultant glycol diacetoxymethyl ether is moderately soluble in water.

*Example 11*

90 parts of butane-diol-(1,4) are heated with 60 parts of paraformaldehyde at 110° C. until all of the paraformaldehyde has reacted. Then 300 parts of dimethylformamide and 202 parts of triethylamine are added, and 154 parts of acetylchloride are dripped into this mixture at 0° C. The whole is then cooled to −20° C. and the separated triethylamine hydrochloride filtered off by suction. On addition of water, the diacetoxymethyl ether of butane-diol-(1,4) separates from the resultant solution.

*Example 12*

A mixture of 88 parts of butene-2-diol-(1,4) and 60 parts of paraformaldehyde is heated at 110° C. until a clear liquid forms. After dripping in 204 parts of acetic anhydride at 50° C., a clear solution of the diacetoxymethyl ether of butene-2-diol-(1,4) is obtained. When poured into ice water, this solution partly separates as a colorless liquid.

Example 13

In the manner described in Example 12, 86 parts of butine-2-diol-(1,4) and 60 parts of paraformaldehyde are reacted to form the bis-hemiformal which is then acetylated with 204 parts of acetic anhydride at 50° C. On dilution with water, only a relatively small proportion of the diacetoxymethyl ether of butine-2-diol-(1,4) is separated.

Example 14

118 parts of n-hexane-diol-(1,6) and 60 parts of paraformaldehyde are reacted with each other in the manner described in Example 12. After subsequent acetylation with 204 parts of acetic anhydride at 50° C., addition of a large amount of ice water, separation of the organic layer and drying with sodium sulfate, the diacetoxymethyl ether of hexane-diol-(1,6) is obtained.

Example 15

In the manner described in Example 12, 118 parts of n-hexane-diol-(2,4) are converted with 60 parts of paraformaldehyde, into the bis-hemiformal which is then acetylated with 204 parts of acetic anhydride. By pouring the whole into ice water, the diacetoxymethylether of hexane-diol-(1,4) is separated which is only sparingly soluble in water.

Example 16

182 parts of anhydrous sorbitol are heated with 360 parts of paraformaldehyde at 120° to 125° C. until a clear liquid forms, which takes about 1 hour. While stirring vigorously, 204 parts of acetic anhydride are dripped in at 70° to 80° C. A clear liquid is obtained from which the acetic acid is extracted by shaking out with diethyl ether. After removing dissolved diethyl ether in vacuo, the tetrahydroxymethyldiacetoxymethyl ether of sorbitol is obtained as a highly viscous product. It is readily soluble in water, alcohol and acetone, but not in diethyl ether, benzene and hexane.

Example 17

In the manner described in Example 16, 182 parts of sorbitol are converted with 360 parts of paraformaldehyde into the hexahemiformal which is then acetylated with 612 parts of acetic anhydride. The glacial acetic acid is extracted from the product by means of petroleum ether, and the hexaacetoxymethyl ether of sorbitol is thus obtained. It is insoluble in water and petroleum ether, but dissolves in alcohol, diethyl ether and benzene.

I claim:

1. A process for the production of carboxylic acid esters of polyfunctional hydroxymethyl ethers wherein an aliphatic organic compound containing from 2 to 6 alcoholic hydroxy groups selected from the class consisting of primary and secondary hydroxyl groups is reacted at a temperature of about 80° C. to 130° C. with from 2 to 6 times the molar amount of formaldehyde and the resulting hemiacetal is treated in the absence of water with 2 to 6 times the molar amount of an acylating agent selected from the class consisting of the anhydrides, halides and ketenes of acetic acid and propionic acid, said aliphatic organic compound having a molecular weight of up to 500 and being a member selected from the class consisting of polyhydroxy aliphatic hydrocarbons and those aliphatic compounds which are derived therefrom by substitution in the hydrocarbon molecule of a member selected from the class consisting of aldehyde, ether, thioether, sulfone, amino and quaternary ammonium groups.

2. A process for the production of carboxylic acid esters of polyfunctional hydroxymethyl ethers wherein an aliphatic amine containing from 2 to 6 alcoholic hydroxyl groups selected from the group of primary and secondary hydroxyl groups and having a molecular weight of up to 500 is reacted at temperatures between 80° and 130° C. with 2 to 6 times the molar amount of formaldehyde and the resultant hemiacetal is treated in the absence of water with 2 to 6 times the molar amount of an acylating agent selected from the group consisting of the anhydrides, halides and ketenes of acetic acid and propionic acid.

3. A process for the production of carboxylic acid esters of polyfunctional hydroxymethyl ethers wherein a substance of the formula:

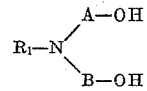

in which A and B represent alkylene radicals with 2 to 4 carbon atoms and $R_1$ is a member selected from the group consisting of alkyl radicals with from 1 to 20 carbon atoms and hydroxyalkyl radicals with from 2 to 4 carbon atoms is reacted at temperatures between 80° and 130° C. with from 2 to 6 times the molar amount of formaldehyde and the resultant hemiacetal is treated in the absence of water with from 2 to 6 times the molar amount of an acylating agent selected from the group consisting of the anhydrides, halides and ketenes of acetic acid and propionic acid.

4. A process for the production of carboxylic acid esters of polyfunctional hydroxymethyl ethers wherein a substance of the formula:

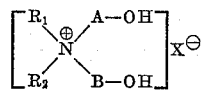

in which A and B represent alkylene radicals with from 2 to 4 carbon atoms, $R_1$ represents a member selected from the group consisting of alkyl radicals with from 1 to 20 carbon atoms and hydroxyalkyl radicals with from 2 to 4 carbon atoms, $R_2$ represents a member selected from the group consisting of alkyl radicals with from 1 to 4 carbon atoms and hydroxyalkyl radicals with from 1 to 4 carbon atoms and $X^\ominus$ represents an anion selected from the group consisting of chloride, sulfate and methosulfate is reacted at temperatures between 80° and 130° C. with from 2 to 6 times the molar amount of formaldehyde and the resultant hemiacetal is treated in the absence of water with from 2 to 6 times the molar amount of an acylating agent selected from the group consisting of the anhydrides, halides and ketenes of acetic acid and propionic acid.

5. A compound of the formula:

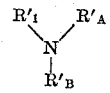

in which $R'_A$ and $R'_B$ represent acyloxymethyleneoxyalkyl groups in which the acyl radical has 2 to 3 carbon atoms and the alkyl radical 2 to 4 carbon atoms and $R'_1$ represents a member selected from the group consisting of acyloxymethyleneoxyalkyl groups in which the acyl radical has 2 to 3 carbon atoms and the alkyl radical 2 to 4 carbon atoms and alkyl groups with from 1 to 20 carbon atoms.

6. A compound of the formula:

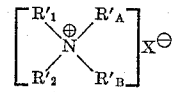

in which $R'_A$ and $R'_B$ represent acyloxymethyleneoxyalkyl-groups in which the acyl radical has 2 to 3 carbon atoms and the alkyl radical 2 to 4 carbon atoms, $R'_1$ represents a member selected from the group consisting of acyloxymethyleneoxyalkyl groups in which the acyl radical has 2 to 3 carbon atoms and the alkyl radical 2 to 4 carbon atoms and alkyl groups with from 1 to 20 carbon atoms, $R'_2$ represents a member selected from the group consisting of alkyl groups with 2 to 4 carbon atoms, hydroxyalkyl groups with 2 to 4 carbon atoms and acyloxymethyleneoxyalkyl groups in which the acyl radical has 2 to 3 carbon atoms and the alkyl radical 2 to 4 carbon atoms, and $X^\ominus$ represents an anion selected from the group consisting of chloride, sulfate and methosulfate.

7. A process as claimed in claim 1 wherein the organic compound is a polyhydroxy aliphatic hydrocarbon.

8. A process as claimed in claim 1 wherein the organic compound is a polyhydroxyalkyl ether.

9. A process as claimed in claim 1 wherein the organic compound is a polyhydroxydialkyl sulfone.

10. A process as claimed in claim 1 wherein the organic compound is a member selected from the group consisting of polyhydroxyalkyl amines and their quaternary ammonium salts.

References Cited in the file of this patent
UNITED STATES PATENTS

| | | |
|---|---|---|
| 2,644,013 | Barth | June 30, 1953 |
| 2,785,995 | Kress | Mar. 19, 1957 |
| 2,796,423 | Cottle et al. | June 18, 1957 |
| 2,931,837 | Stansbury | Apr. 5, 1960 |
| 2,962,419 | Minich | Nov. 29, 1960 |